Patented Jan. 10, 1928.

1,655,608

UNITED STATES PATENT OFFICE.

REED W. HYDE, OF SUMMIT, NEW JERSEY, ASSIGNOR TO DWIGHT & LLOYD SINTERING COMPANY, INC., OF NEW YORK, N. Y., A CORPORATION OF DELAWARE.

PROCESS FOR TREATING ALUMINUM-BEARING ORES.

No Drawing.    Application filed December 22, 1926.   Serial No. 156,528.

This invention relates to the treatment of oxide ores of aluminum, and more particularly to a method of preparing ores and materials containing aluminum oxide and moisture to render them suitable for a subsequent treatment.

The commercial ores of aluminum contain considerable proportions of water, for example, the mineral bauxite, $Al_2O(OH)_4$, contains some 26 percent of chemically combined water and in addition the ore usually carries large quantities of mechanical moisture. In the metallurgical treatment of these ores it is of course desirable to remove this moisture in order to facilitate the operations in the furnace and to avoid the expenditure of an unnecessary amount of heat for the purpose of eliminating the water before the metal itself can be directly acted upon.

Should the water be removed by ordinary drying methods in which the ore is crushed and dried, the resultant product will be in the form of fine, loose particles which are soft and friable and relatively light in weight. These particles themselves are not well adapted for subsequent treatment on account of their low density and tendency to pick up and store moisture unless treated immediately after drying.

It is, therefore, desirable to utilize aluminum ores in the form of cakes having relatively large surface area and maximum density, these cakes being preferably dehydrated as completely as possible.

The usual method of dehydration such as by heating in rotary kilns wherein heat is supplied from an external source will not operate efficiently unless the ore is previously crushed. Moreover, the temperature is not sufficiently high to fuse the aluminum oxides, consequently the product of the roasting operation will be in the above mentioned finely divided condition.

On the other hand, should the temperature be forced to a degree sufficiently high to cause the particles to fuse and form cakes, an excess amount of heat would be required which would be injurious to the lining of the kiln and render the operation expensive and inefficient. Furthermore, the resultant product would be of a dense and solid structure which would not be best adapted to subsequent operations.

The present invention relates to a method of treating materials such as aluminum bearing ores whereby the combined water and mechanical moisture may be eliminated and at the same time the resultant product will be in a form suitable for subsequent metallurgical treatment.

The process further relates to a method of treating aluminum ores to form an open cellular cake which is completely dehydrated and which, while comparatively light as a whole contains particles of alumina which are of comparatively dense structure in themselves. The open cellular cake presents a large surface area for permitting intimate contact with heat or reagents in subsequent operations thereby enabling such processes to be carried on more rapidly and efficiently.

The invention still further relates to an open cellular cake formed from an aluminum bearing ore which is dehydrated and which is of a sufficiently dense and stable form to prevent moisture from being readily absorbed. The cake may therefore be stored in contact with the atmosphere without absorbing moisture therefrom or impairing its usefulness for further operations.

The invention further consists in the new and novel features of operation and the new and original arrangements and combinations of steps in the process hereinafter described and more particularly set forth in the claims.

The above features and others which will be apparent as the nature of the invention is more fully disclosed are accomplished in the present process by dehydrating the ore by means of heat developed directly in contact with the ore particles, and immediately subjecting the ore particles to a high temperature below the fusion point of the alumina and cementing the particles together by means of a binding agent which is developed by the treatment.

In general, the invention consists in mixing with particles of aluminum ore a small proportion of material capable of forming aluminates, such as iron oxides, manganese oxides, or an equivalent material, and a solid combustible material. The combustible material in the mixture is then burned, developing heat which drives off both the mechanical moisture and the combined water from the ore and also causes reactions to take place between the added oxides and a portion of the aluminum oxides which result in forming compounds which at the high temperature developed, melt and bind together the particles of the aluminum bearing material.

One method by which this invention may be practiced will now be described, and in this description bauxite ore and iron oxides will be used in illustration, although it is to be understood that the invention is not limited to these materials. The bauxite ore may be crushed to small particles, preferably of approximately one-quarter inch size and less, and then mixed with a small proportion of fine iron oxide material, for example, hematite fines or pyrites cinder, and with solid combustible material such as fine coke or coal. Usually from five to ten per cent of iron oxides and six to eight per cent of combustible will be sufficient although it will be understood that other proportions of these materials may be found satisfactory with some ores.

In some cases the aluminum ore itself may contain some iron oxide so that less of this material need be added than is indicated above. Instead of iron oxides, other materials such as manganese oxides, zinc oxide, and other materials which form aluminates may be used with similar results.

The materials may be moistened slightly, if necessary, and thoroughly mixed to a uniform mass, which may then be placed in a substantially even, permeable mass or layer on a support such as a kettle or pot having a grate bottom. By suitable means currents of air or other combustion-supporting gases may be caused to pass through the mass, and the combustible material at one surface may be ignited, as by the temporary application of a flame or by heat radiated from an electrical resistor. After this brief surface ignition, combustion of the fuel ingredient within the mass is continued by the passage of the combustion-supporting gas through the mass, the resulting carbon oxide gases enveloping the particles of ore and iron oxide.

Heat is thereby developed in direct contact with the particles of ore and iron oxide in the mass, and the temperature of the particles is rapidly increased. The water, both that mechanically held and that chemically combined, is first driven off, and then the temperature increases to points where reactions can occur between the iron oxides and the dehydrated aluminum oxide.

At the high temperature developed by this internal combustion, which may be 1200° C. or even more, the iron oxides combine with adjacent molecules of aluminum oxide, forming iron aluminates or spinels which are more fusible than the remaining aluminum oxide and which, under the influence of the currents of gases, are caused to surround or cement together the particles of aluminum oxide and are then quickly cooled, so that the mass is converted into a strong but cellular cake. At the same time these aluminum oxide particles are converted by the heat into particles having a density much greater than that of the original bauxite. The ore is thus converted into a mass which, in its entirety, is cellular and porus, but in which the now dense particles of aluminum oxide are firmly embedded and held together by the iron aluminates to form a strong cellular cake.

This cake, may be broken into smaller pieces for charging into a furnace, but such pieces remain firm, dense and cellular, and may easily be handled and treated without dusting or otherwise disintegrating prematurely. They form an ideal material for treatment since an increased quantity may be charged into a furnace relatively to the lighter dried bauxite, and since, by reason of their cellular character an enormous surface area is exposed so that the material may be reacted upon with unexpected facility.

The cakes formed by this method may be stored without protection from the weather, since water drains readily from them and is not retained, as is the case with bauxite which has merely been dried. Furthermore, water is not absorbed from the atmosphere by the dense particles in the cellular mass. If silica is present, iron silicates may also be formed, which likewise help to bind together the particles of alumina. It will be evident that the product obtained by this method may be used for various purposes such, for example, as the manufacture of artificial abrasives.

The treatment may be made continuous, if desired, by utilizing a traveling support on to which the mixture may be continuously fed and which carries it past an igniting means and means for causing currents of air or other combustion-supporting gases to pass through the mass.

This invention discloses a simple method for preparing ores of aluminum for metallurgical treatment. It is economical to practice, requires much less fuel than does the ordinary method of drying and dehydrating this material. The product is ideal both because an increased quantity may be charged into a furnace and also because it may be treated more rapidly.

The treatment may be given the ore at the mines or any convenient point, with a large saving in freight by reason of the decreased weight, since the product is dry and free from combined moisture and is not susceptible to atmospheric moisture. It may be stored indefinitely without being damaged. The process may be carried on in well known and simple form of apparatus, without the employment of unusually skilled labor.

Although certain novel features of the invention have been shown and described and are pointed out in the annexed claims, it will be understood that various omissions, substitutions and changes in the several steps of the process and in its operation may be made by those skilled in the art without departing from the spirit of the invention.

What is claimed is:

1. The process of treating aluminum bearing material which consists in crushing the material to small particles, mixing the particles with particles of aluminate forming materials and with fine combustible material, placing the mixture on a support such that gases may be passed therethrough, igniting the combustible material at one surface of the mass, passing combustion-supporting gases through the mass to burn the combustible material and generate heat within the mass thereby driving off the water to form alumina, converting the alumina to a denser form and simultaneously causing the aluminate forming material to combine with a portion of the alumina, melting the compounds so formed and cooling them quickly to bind together the particles of alumina thereby forming a strong cellular cake.

2. The process of treating aluminum bearing material which comprises crushing the material, mixing an aluminate forming material therewith, arranging the mixture together with particles of fine combustible material in a thin layer, igniting the combustible material at one surface of the layer, passing combustion-supporting gases therethrough to burn the combustible material and generate heat within the mass whereby moisture is driven off and the aluminum bearing material is converted to alumina and caused to unite with the aluminate forming material to produce a compound of lower fusion point than that of the alumina, causing the compound to fuse and quickly cooling the fused mass, whereby the alumina particles are cemented together to form a mass having an open cellular structure.

3. The process of treating ores containing aluminum oxides which comprises crushing the ore, mixing an aluminate forming material and finely divided combustible material therewith, arranging the mixture in a thin layer, igniting the combustible material at one surface of the layer, passing combustion-supporting gases therethrough to burn the combustible material and generate heat within the mass whereby moisture is driven off and the aluminum oxides are caused to unite with the aluminate forming material to form a compound of lower fusion point than that of the aluminum oxide, causing the compound to fuse, quickly cooling the fused mass whereby the aluminum oxide particles are cemeted together and a cellular structure is produced, 4. The process of treating aluminum ores which comprises crushing the ore, mixing an iron oxide bearing material and finely divided combustible material therewith, arranging the mixture in a thin layer, igniting the combustible material at one surface of the layer, passing combustion-supporting gases therethrough to burn the combustible material and generate heat within the mass whereby moisture is driven off and alumina is formed and causing the alumina to unite with the iron oxide bearing material to form a compound of lower fusion point than that of the alumina, causing the compound to fuse and quickly cooling the fused mass whereby the alumina particles are cemented together and an open cellular structure is produced.

5. The process of treating aluminum oxide ores which comprises crushing the ores, mixing an iron oxide bearing material and finely divided coal therewith, arranging the mixture in a thin layer, igniting the combustible material at one surface of the layer, passing combustion-supporting gases therethrough to burn the combustible material and generate heat within the mass whereby moisture is driven off and the aluminum oxide is caused to unite with the iron oxide to form a compound of lower fusion point than that of the aluminum oxide, causing the compound to fuse, and quickly cooling the fused mass whereby the aluminum oxide particles are cemented together and an open cellular structure is produced.

6. The process of treating aluminum ores which comprises crushing the ore, mixing an aluminate forming material and a finely divided combustible material therewith, arranging the mixture in a thin layer, moving the layer continuously under an igniter whereby the combustible material is ignited at one surface of the layer, continuously passing combustion-supporting gases therethrough to burn the combustible material and generate heat within the mass whereby moisture is driven off and dehydrated alumina is formed and causing the alumina to unite with the aluminate forming material to form a compound of lower fusion point than that of the alumina, causing the compound to fuse, and quickly cooling the fused mass whereby the alumina particles are cemented together and an open cellular structure is produced.

In testimony whereof I have hereunto set my hand.

REED W. HYDE.